UNITED STATES PATENT OFFICE.

EMILE LAMM, OF NEW ORLEANS, LOUISIANA.

IMPROVED METHOD OF PREPARING GOLD FOR DENTISTS.

Specification forming part of Letters Patent No. 56,765, dated July 31, 1866.

*To all whom it may concern:*

Be it known that I, EMILE LAMM, of the city of New Orleans and State of Louisiana, have invented a new and Improved Mode of Making Gold into Crystal Shreds or Leaves of the form and consistency most suitable and convenient for filling carious teeth and for other purposes; and I do hereby declare that the following is a full and exact description thereof.

I first make a solution of fine gold, of eighteen carats or upward, in nitro-muriatic acid or "*aqua regia*," as it is usually called, by the usual process well known to chemists and metallurgists. I then have a concentrated saturated solution of bichloride of gold, to which I add thrice its volume of distilled water and filter through filtering-paper on a glass funnel, so as to get rid of the insoluble chloride of silver or any other insoluble substance which the fluid may contain. I then take a quantity of pure crystallized sugar candy equal to exactly half the weight of the gold in the solution and add it to the solution of bichloride of gold. This mixture I then pour into a Florence flask, or any other vessel which will stand heat and which is not acted on by the solution of gold. I then put the vessel and its contents on a steam-bath and keep it there until gold ceases to be thrown down.

By this process the gold is precipitated in the form of bright metallic leaves or crystals. These I throw upon a filter and wash, first, with distilled water, then with aqua-ammonia, and again with distilled water. I then subject the gold to a bright-red heat, at which temperature it is absolutely impossible for acids to contaminate or remain in the mass. I thus get the gold in beautiful crystal leaves proved to be absolutely pure gold by the finest tests known to science.

The advantages of this process consist, chiefly, in the greater density and more convenient form of the crystal shreds or leaves of gold, making it superior to any other form of adhesive gold ever invented. It welds or adheres more readily in the natural fluids of the mouth, and by its density and purity enables the operator to perform his work more speedily and perfectly, saving both time and discomfort to the person operated upon.

I do not confine myself to the exact proportions above described, nor to the precise form of crystallized sugar candy used to precipitate the gold from its solution.

The valuable discovery which I claim to have made consists in the fact that gold, when precipitated from its solution in nitro-muriatic acid by the use of pure saccharine substances, becomes a plastic mass of pure crystal leaves, more convenient and useful in form than that produced by any other known process.

What I claim, therefore, as my invention, and desire to secure by Letters Patent, is—

The use of saccharine substances to precipitate gold from its solutions in the manner and by the process above described, or by any substantially equivalent process, thereby forming a mass of crystal shreds extremely useful and convenient for dental and other purposes.

E. LAMM.

Witnesses:
 FRED. F. STANTON,
 JAMES CRUTCHETT.